United States Patent
Li et al.

(10) Patent No.: US 11,086,046 B2
(45) Date of Patent: Aug. 10, 2021

(54) SYSTEM AND METHOD FOR THE CALIBRATION OF AZIMUTHAL RESISTIVITY LOGGING TOOLS

(71) Applicant: Maxwell Dynamics, Inc., Houston, TX (US)

(72) Inventors: Hu Li, Katy, TX (US); John Qiang Zhou, Sugar Land, TX (US)

(73) Assignee: MAXWELL DYNAMICS, INC., Houston, TX (US)

( * ) Notice: Subject to any disclaimer, the term of this patent is extended or adjusted under 35 U.S.C. 154(b) by 712 days.

(21) Appl. No.: 15/964,713

(22) Filed: Apr. 27, 2018

(65) Prior Publication Data

US 2019/0331830 A1    Oct. 31, 2019

(51) Int. Cl.
*G01V 13/00*    (2006.01)
*G01V 3/28*    (2006.01)

(52) U.S. Cl.
CPC .............. *G01V 13/00* (2013.01); *G01V 3/28* (2013.01)

(58) Field of Classification Search
CPC ........... G01V 3/28; G01V 3/104; G01V 13/00
See application file for complete search history.

(56) References Cited

U.S. PATENT DOCUMENTS

| 10,072,490 B1* | 9/2018 | Tchakarov | G01V 3/12 |
| 10,359,536 B2* | 7/2019 | Donderici | G01V 3/28 |
| 2015/0369950 A1* | 12/2015 | Wu | G01V 3/30 |
| | | | 702/7 |

* cited by examiner

*Primary Examiner* — Bryan Bui
(74) *Attorney, Agent, or Firm* — Richard A. Fagin

(57) ABSTRACT

A system and method for the calibration of downhole azimuthally sensitive resistivity tools is disclosed. The system and method can eliminate and/or compensate for the measurement errors due to the electronic circuit, the mechanical structure, etc., of the tool. The system and method also can validate the measurement accuracy. The downhole azimuthal resistivity logging tool can be, but not limited to, the LWD azimuthal resistivity tools with coil(s) oriented in the directions other than the tool axis. In one embodiment, the system is constructed by the azimuthal resistivity tool, a tilted calibration loop made of conductive wire; an external resistor; and an external inductor. Some other method embodiment comprises an azimuthal resistivity tool, a semicircular conductive wire connected with a conductivity rectangular wire, and the external resistor and inductor. Although this disclosure is primarily intended for azimuthal resistivity Logging-While-Drilling (LWD) or Measuring-While-Drilling (MWD) tools, the disclosure is also applicable to wireline and any other possibly equipment.

13 Claims, 10 Drawing Sheets

SYSTEM AND METHOD FOR THE CALIBRATION OF AZIMUTHAL RESISTIVITY LOGGING TOOLS

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates generally to a system and method for calibrating azimuthally sensitive resistivity Logging-While-Drilling (LWD) tools. More specifically, this disclosure relates to error reduction in the electronic equipment disposed in subsurface wells ("downhole" equipment) resulting from manufacturing imperfection and variation in tool electronic circuit components, the mechanical structure of the tools, and the ambient environments in which such tools are operated.

In the oil and gas extraction ("petroleum") industry, wells have been designed and drilled into the underground for oil and gas exploration and production. Modern directional drilling methods and required well placement precision demand a great quantity of information relating to physical properties of the formation and drilling environments. The collection of the downhole measurement information may be recorded and displayed with reference to axial position ("depth") along the well at which measurements are made, such record being commonly referred to as a "well log". Well logging is the practice of making a detailed record of measurements of formation properties near and along the well trajectory. The well log may be based either on visual inspection of samples brought to the surface or on recordings of physical measurements made by instruments lowered into the downhole. Among various kinds of downhole well logging instruments, electrical resistivity logging tools were among the earliest developed and are at present the most widely used type.

"Deep" and "Ultra-Deep", where depth in such instance refers to distance from the longitudinal axis of the measuring instrument, and azimuthally sensitive resistivity LWD tools may be considered state of the art for providing downhole resistivity information contemporaneously with the drilling of the well. As illustrated in Hartmann, A. et al., 2014, *Verification testing of a new extra-deep azimuthal resistivity measurement*, and Seydoux, J. et al., 2014, *Full 3D deep directional resistivity measurements optimize well placement and provide reservoir-scale imaging while drilling*, "deep resistivity tools" refers to tools which can detect a remote resistivity contrast boundary within detection distances of 3 to 5 meters, and "Ultra-Deep" as in excess of 30 meters. The deliverables from this kind of LWD tool include at least an "apparent resistivity" log and a "geosignal" log. The former conveys the resistivity information about the formation. While the latter, which is associated with geologic boundaries and resistivity inhomogeneity, can evaluate the Distance to Boundary (DTB) and its relative direction to the well quantitatively. Thus, the effectiveness and accuracy of the measurements provided by LWD Deep and Ultra-Deep azimuthal resistivity tools are useful for directional drilling (i.e., drilling a well along a selected trajectory) and well placement (placing the well path within selected distances of predetermined geologic features).

Accurate calibration of Deep or Ultra-Deep azimuthal resistivity LWD tools is an essential task in the development and application of these tools. Factors such as imperfections in tool manufacturing, variations due to the electronic circuits and mechanical structure can introduce significant measurement errors. There are two principal purposes for tool calibration. The first is to eliminate and/or compensate for the errors introduced in the measurement channels. Second is to calibrate the response of the tool to a predetermined environmental value when the tool is disposed in an environment having known electromagnetic properties.

There are some calibration methods for so-called "wireline" electromagnetic logging tools, i.e., those conveyed along a wellbore at the end of an armored electrical cable. As an example of such methods, "air hanging", the induction logging tool may be suspended a predetermined in the air above the Earth's surface and laterally displaced from any electrically conductive media. The apparent conductivity (the inverse of resistivity) measurement made by the tool should be near-zero and the geosignal should be zero. Any deviation from zero is subtracted from the respective measurements and is assumed to be related to systematic measurement errors. However, considering the (lateral) Depth of Detection (DOD) of Deep and Ultra-Deep azimuthal resistivity LWD tools, to obtain the forgoing results, the height over the ground should be tens of meters to avoid the effects of electrically conductive materials on the earth surface and of the earth. Additionally, a near-zero conductivity environment can only provide one standard instrument response (i.e., the zero offset), which is not sufficient for full calibration of the tool, which requires a gain measurement in a conductive environment.

U.S. Patent Application Publication No. 2004/0113609 A1 discloses a calibration method using a testing loop to provide a standard voltage induced in the receiver of an electromagnetic tool. However, the correction could only be approximate given the presence of the Earth's surface. Additionally, the standard voltage calibration would not be necessary for the characterization of an azimuthal resistivity tool due to its signal definition.

U.S. Patent Application Publication No. 2016/0170068 A1 disclose another calibration approach using an external loop transmitter and/or receiver to provide the standard response. However, to correct the errors of the transmitter electronic circuit and receiver electronic circuit separately would not be accurate enough for the calibration of the tool.

Then, for induction wireline logging tools, some other calibration methods try to take advantage of the earth surface, such as U.S. Patent Application Publication No. 2005/0143920 A1 and U.S. Pat. No. 8,305,082. In methods disclosed in the foregoing documents, the effects of the earth surface are removed by using two or more measurements when the tool at different heights or by using two different electromagnetic excitation frequencies. The foregoing methods can only evaluate approximately the effects of earth surface on the measurements.

More recent developments for the calibration of Deep and Ultra-Deep azimuthal resistivity tools include those described in, Hartmann, A. et al., *Verification testing of a new extra-deep azimuthal resistivity measurement*, SPWLA 55th Annual Logging Symposium (2014), which provide a calibration system and procedure for an Ultra-Deep azimuthal resistivity LWD tool. The disclosed process is implemented by hanging and pulling the tool up to 30 m above a sea surface. While this method may provide the compensation for the systematic errors of the tool, it could be difficult and costly to implement since the tool could be tens of meters long and has to be suspended at 30m or more in height U.S. Patent Application No. 2015/0301222 A1 discloses an inversion-based calibration method for Ultra-Deep azimuthal resistivity tool that calibrates the tool after it is lowered into downhole and located in a specific environment. The disclosed method is designed for the implementation at a well drilling site. However, the correction based on an inversion could be an approximated result and an ideal environment for the calibration downhole is not always easy to find.

Therefore, there remains a need for a calibration system and method for Deep and Ultra-Deep azimuthal resistivity tools. The system should be simple and portable. The calibration procedure should be easy to implement, and the results should be accurate.

SUMMARY

Accordingly, there is provided herein an approach to calibrate azimuthal electromagnetic LWD tools to eliminate and/or compensate for the systematic errors introduced from the tool design, electronic circuit, mechanic structure, and manufacturing, etc. The methods disclosed herein also provide an approach to calibrate the response of azimuthal electromagnetic LWD tool to be a predetermined value when the tool is disposed in an environment having known electromagnetic properties. The electromagnetic LWD tool may be, but is not limited to any Deep azimuthal resistivity tool, any Ultra-Deep azimuthal resistivity tool, and any other implementation of a downhole resistivity tool.

In one embodiment, a system comprises a tilted conductive calibration loop, wherein tilted means a plane defined by the calibration loop at an oblique angle with reference to the longitudinal axis of the tool; an external resistor; and an external inductor. The external resistor and inductor are connected to an electrically conductive loop to enable providing the impedance of the system. Some other method embodiment comprises the azimuthal resistivity tool, a semicircular conductive wire connected with a rectangle conductive wire, and an external resistor and inductor.

This disclosure also relates to calibration procedures, which include the positional relationship between the azimuthal resistivity tool and the calibration system, to a method to evaluate and remove earth surface effects, the possible values of the resistor and inductor connected to the calibration loop, and the method to evaluate systematic errors.

BRIEF DESCRIPTION OF THE DRAWINGS

For detailed description of the various disclosed embodiments, reference will now be made to the accompanying drawing in which.

DETAILED DESCRIPTION

The issues identified in the background may be addressed by various embodiments of the systems and methods for performing calibrating procedures according to the present disclosure. Embodiments according to the disclosure may be capable of eliminating and/or compensating for systematic errors introduced from the tool design, electronic circuit, mechanic structure, and manufacturing, etc. The method and the embodiments thereof disclosed herein may also be capable of calibrating the response of the Deep and Ultra-Deep azimuthal resistivity LWD tool to a specific resistivity and distance to boundary (DTB) value under a specific condition.

Figure 1:
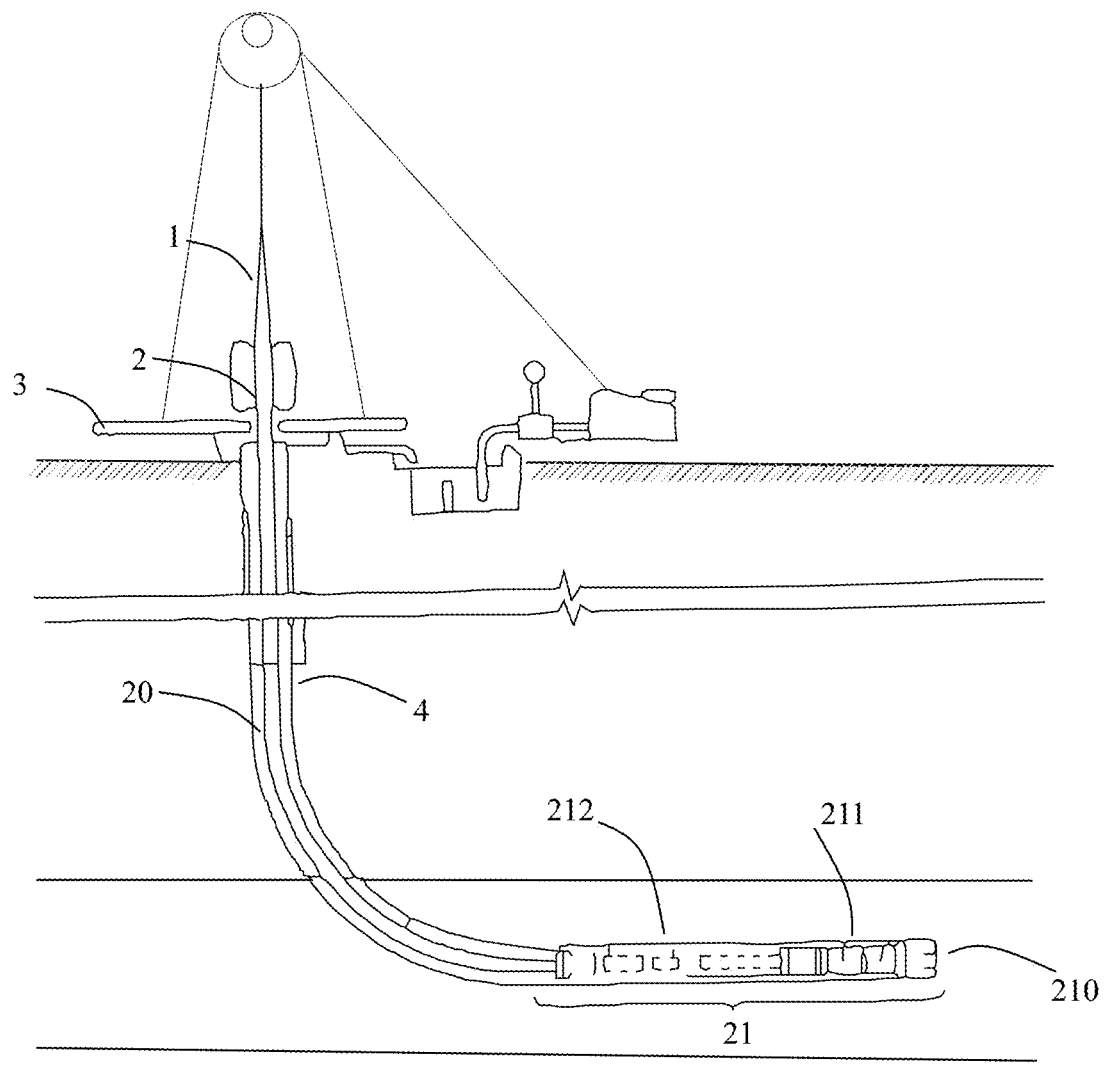
FIG. 1 shows an illustrative logging while drilling environment.

To illustrate context for the disclosed systems and methods, FIG. 1 shows a well during drilling operations. A drilling rig 1 at the surface of the well supports a drill string 2. The drill string passes through a work platform 3 and into a wellbore 4 that is drilled through subsurface earthen formation. The drill string 2 may comprise drilling pipe 20, such as jointed pipes and a bottom hole assembly 21 (commonly referred to as a "BHA") proximate the lower end of the drill pipe 20. The BHA 21 may include a drill bit 210, a downhole drilling motor 211, one or more drilling collars, an azimuthal resistivity tool 212, and in some embodiments other downhole tools. In the present embodiment, the BHA 21 may include a Logging While Drilling system, referred to herein as an "LWD" system. The LWD system may be located close to the drill bit 210 to facilitate the ability to examine the formation as close to the bit 210 as possible.

Figure 2A:
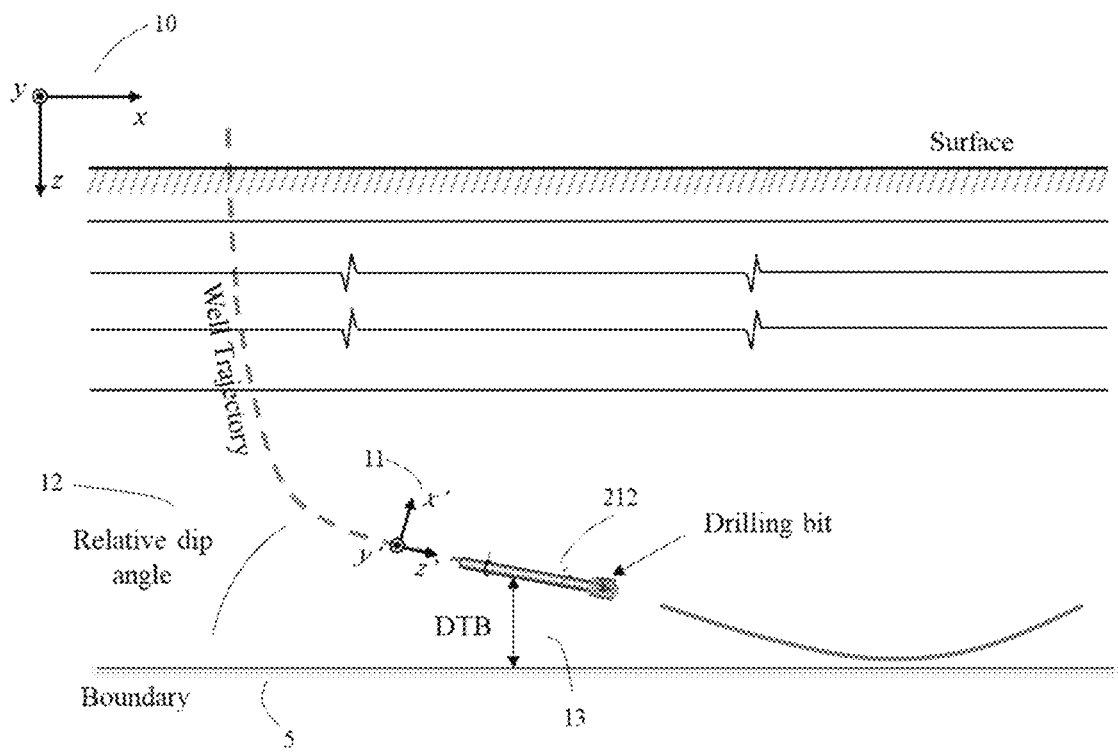
FIGS. 2a and 2b show the coordinates systems for describing the geometric relationship between the downhole assembly and the formation.
Figure 2B:
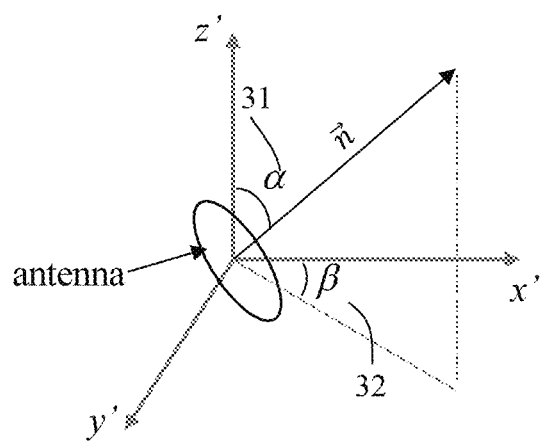
Figure 3A:
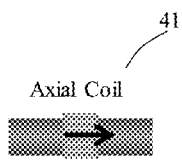
FIGS. 3a, 3b, 3c and 3d show an illustrative Deep and Ultra-Deep Azimuthal Resistivity LWD tools' structure.
Figure 3B:
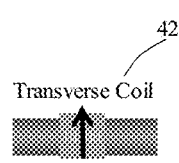
Figure 3C:
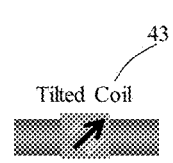
Figure 3D:
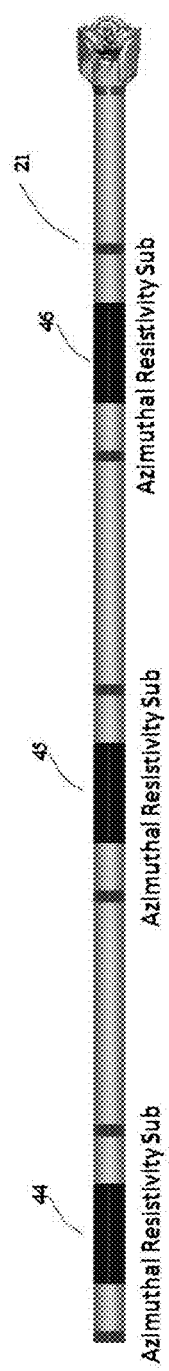

One valuable purpose of LWD systems is to predict an approaching formation boundary in real-time. Thus, the direction of the drilling can be adjusted so that the well could stay in a target formation, for example, an oil-rich reservoir, as long as possible. As illustrated in FIG. 2a, the tool is approaching a boundary 5 from below with a relative dip angle 12. When the boundary is inside the Depth of Detection (DOD) of the tool, the response of the azimuthal resistivity tool will be affected by the presence of the boundary 5. The Distance to Boundary (DTB) 13 can be evaluated from the measurements made by the tool 212. Two coordinate systems, which will be mentioned below are also illustrated in FIG. 2a. The two coordinates systems are the earth (geodetic) coordinates (x,y,z) 10, shown as referenced to the well origin in FIG. 2a, and the tool frame of reference coordinates (x',y',z') 11. The z-axis of the earth coordinates (x,y,z) is perpendicular to the boundaries of the formation. The tool coordinates can be regarded as the earth coordinates rotated along the y-axis. As shown in FIG. 2b, the direction of the antenna may have a relative angle α 31 with respect to the z'-axis and an azimuthal angle 32 with respect to the x'-axis.

FIGS. 3a through 3d show illustrative Deep and Ultra-Deep azimuthal resistivity LWD tool structure. From FIGS. 3a-3c, the structures of an axial antenna in the form of a coil 41, transverse antenna (coil) 42 and tilted antenna (coil) 43 are displayed. The direction of the magnetic dipole of an axial coil is parallel to the tool axis (see FIG. 3a), while, a relative angle exists between the direction of the magnetic dipole of a tilted coil (see FIG. 3b) with respect to the tool. This angle of the tilted coil can be 0° to 90°. When the magnetic dipole angle is 90° with reference to the tool longitudinal axis, the tilted coil is then a transverse coil.

An azimuthal resistivity tool has at least one transmitter or receiver antenna (e.g., a wire coil) that is a tilted or a transverse antenna. The azimuthal tool normally comprises one or more transmitter coils and one or more receiver coils. Two different types of coil structures are used to measure directional (azimutally sensitive) information. Type I consists of an axial transmitter with a transverse receiver (or a transverse transmitter with an axial receiver). In the present context "axial" means having a dipole moment parallel to the longitudinal axis of the tool; "transverse" means such moment is at a right angle to the longitudinal axis. For this kind of configuration, the voltages (VR 51 and VI 52) induced in the receiver coil are used directly as deliverables $$VR = \text{real}(V_{receiver}), VI = \text{imag}(V_{receiver}) \quad (1)$$

Type II is comprised of a tilted coil as a transmitter (or receiver) and another coil as receiver (or transmitter). For this kind of structure, the geosignals are obtained by calculating the amplitude ratio and phase shift between two measurements with the tool azimuth (rotational orientation about the longitudinal axis) differing by 180°. For example, $\beta_1$ and $\beta_2$ are two specific values of azimuth angle $\beta$ as defined in FIG. 2b, one may use $\beta_1 = 0°$ and $\beta_2 = 180°$ to denote, respectively, the up and down direction in which the receiver points to during rotation. The directional amplitude-attenuation (GA) 53 and phase-shift (GP) 54 for a single transmitter-receiver antenna pair can be expressed as:

$$GA = 20 \lg_{10} \frac{\text{sqrt}([\text{Re}(V_{\beta_1})]^2 + [\text{Im}(V_{\beta_1})]^2)}{\text{sqrt}([\text{Re}(V_{\beta_2})]^2 + [\text{Im}(V_{\beta_2})]^2)} \quad (2)$$

$$GP = \tan^{-1} \frac{\text{Im}(V_{\beta_1})}{\text{Re}(V_{\beta_1})} - \tan^{-1} \frac{\text{Im}(V_{\beta_2})}{\text{Re}(V_{\beta_2})} \quad (3)$$

Here, $V_{\beta_1}$ and $V_{\beta_2}$ are the complex potential of the receiver at $\beta_1$ and $\beta_2$ respectively.

Note that the placement of the transmitter coils and/or receiver coils is not limited to being in or on any one or more subs (short length segments of a tool housing). As may be observed in FIG. 3d, the transmitter antenna and receiver antenna can be in different subs 44, 45, 46 and in one or more subs, any or all of which may be part of the BHA 21. The signal definitions given above are just example definition. Other definition can also be used as the reference frame for the tool.

Figure 4:
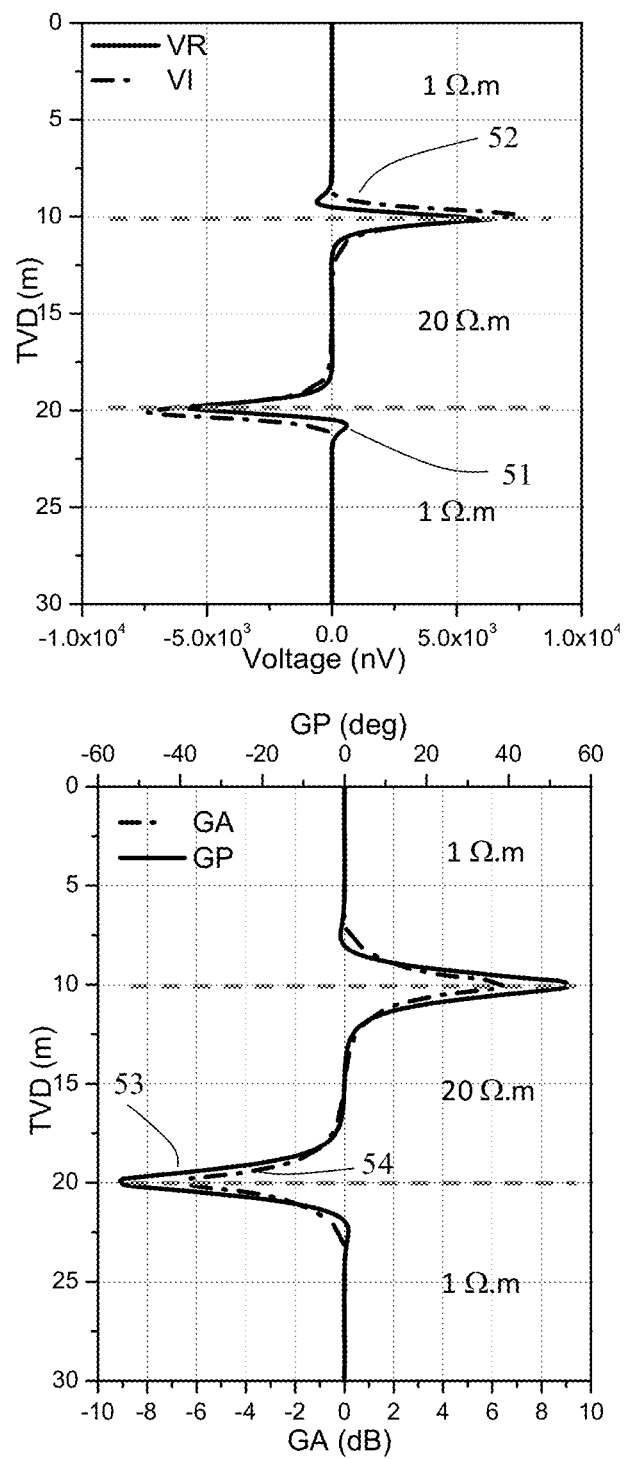
FIG. 4 shows the response of a typical Deep Azimuthal Resistivity tool in a simple formation environment.

FIG. 4 presents graphs of example responses of geosignals to a simple formation model. The azimuthal resistivity LWD tool penetrates a resistive layer from a supervening shale, through a resistive layer (e.g., a hydrocarbon bearing formation) and into a shale below the resistive layer. The amplitude of the geosignal indicates the distance to the boundary from the tool center, while the polarity of the geosignal shows the resistivity relationship between the present layer and the approaching layer. For example, the geosignal is positive when the tool approaches a more resistive layer below the tool and is negative when the tool approaches a more resistive layer above the tool.

Figure 5A:
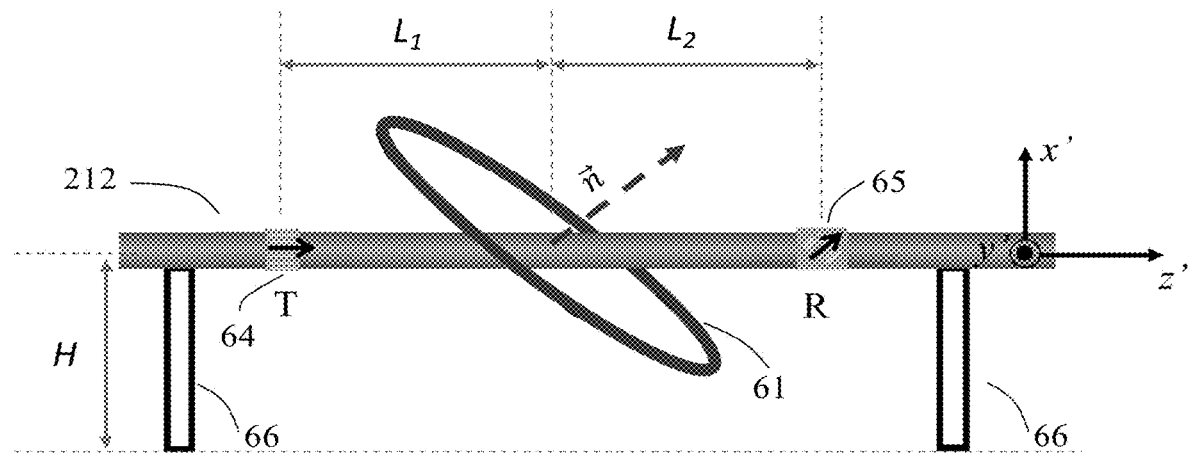
FIGS. 5a, 5b and 5c show an illustrative structure of one embodiment of a calibration system.

FIG. 5a illustrates a calibration apparatus in the form of a calibration loop 61 for calibrating an azimuthal resistivity LWD tool according to one embodiment of the disclosure. The azimuthal resistivity tool 212 may be a Deep azimuthal resistivity tool, an Ultra-Deep azimuthal resistivity tool, or any other azimuthally sensitive measurement tool. As illustrated in FIG. 3, the tool 212 comprises at least one transverse or tilted coil as a transmitter and/or a receiver.

The calibration loop 61 may be made using highly electrically conductive, e.g., metallic material. The calibration loop 61 lies in a plane that intercepts the tool 212. The tool 212 is laid on a frame 66, which is manufactured using non-magnetic and electrically non-conductive materials. The height H of the frame 66 above the ground surface can be adjusted for the convenience of the calibration processing.

Figure 5B:
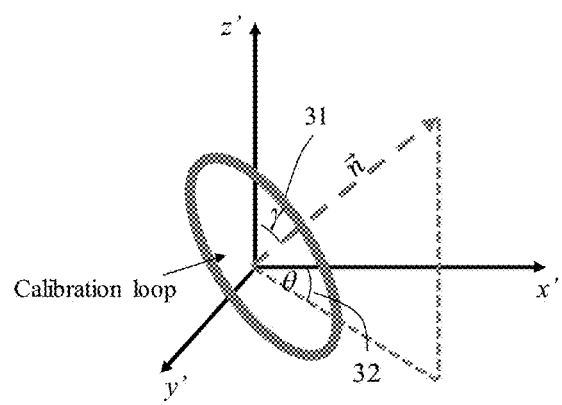

The normal $\vec{n}$ to the plane of the calibration loop 61 may be coaxial with the tool longitudinal axis (the z'-axis). The normal $\vec{n}$ to the plane of the calibration loop 61 may also have an arbitrary relative angle γ with respect to the z'-axis and an arbitrary relative angle θ with respect to the x'-axis (see FIG. 5b).

Figure 5C:
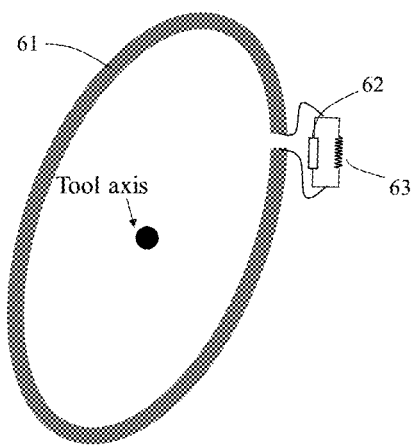

A carefully selected external resistor 62 and/or inductor 63 (see FIG. 5c) may be connected within the calibration loop 61 to provide the desired impedance in the system. The criteria for the "correct" value of the impedance (which will be discussed below) are to produce the responses, which are equivalent to the responses generated by a formation boundary, in the receiver 65. Table 1 shows resistor values to use for various distances to a boundary. However, the size and shape of the resistor and/or inductor will not affect the size, shape and location of the calibration loop 61.

Due to this arrangement, the magnetic dipole moment of an electromagnetic transmitter antenna, which could be an axial, transverse, or tilted coil, would have a magnetic moment oriented in a direction not coaxial with the tool axis. When the magnetic moment of the transmitter 64 is perpendicular to the plane of the calibration loop 61, no magnetic lines of force pass through the calibration loop 61, thus no current is induced in the calibration loop 61. If a relative angle exists between the magnetic moment of the transmitter 64 and the normal direction to the plane of the calibration loop 61, magnetic lines of force will pass through the calibration loop 61. If the transmitter 64 radiates a constant-amplitude sinusoidal electromagnetic wave, the time harmonic electromagnetic wave will induce a time harmonic magnetic flux through the calibration loop 61. Then, electric current will be induced in the calibration loop 61, which in turn generates a secondary electric field in the receiver antenna 65.

Take one calibration loop for example, the E field in the calibration loop can be expressed as the superposition of the primary field $E^P$ and the secondary $E^S$ field:

$$E^T = E^P + E^S \quad (4)$$

$E^P$ is the E field generated by the transmitter coil (or dipole) in a medium (such as air) without the presence of the calibration loop. $E^P$ can be evaluated using the formula (5):

$$E^P = i\omega\mu \int_V dr' G(r, r') \square J(r') \quad (5)$$

Here, i=sqrt(−1), ω is the angular frequency, μ is the permeability of the air, G(r,r') is the dyadic Green's function. r and r' are the positions of the observer and the source, respectively. J(r') is the current density of the source.

The second term in Eq. (4) is the $E^S$ field generated by the calibration loop itself, which can also be expressed by Eq. (5), except that the source is substituted with the current on the calibration loop:

$$E^s = i\omega\mu \int_V dr'_c G(r, r'_c) \square J(r'_c) \quad (6)$$

Here, $r'_c$ is used to denote the source position on the calibration loop.

Thus, the E field can be determined by solving the integral equation system defined in Eq. (4), and the voltage induced (Vcal) in the receiver can be determined. Under the definition given in Eq. (1) through (3), the standard geosignals (denoted here as VRcal, VIcal, GAcal, GPcal) can be determined.

Figure 6:
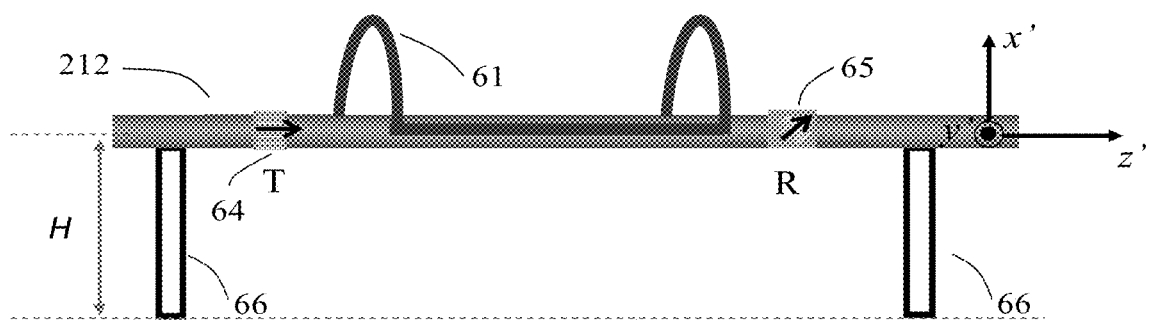
FIG. 6 shows another illustrative structure of an embodiment of the calibration system.

Although one possible implementation of the calibration apparatus is illustrated in FIG. 5, the scope of the present disclosure is not limited to such particular apparatus. The calibration loop can be circular, ellipsoid, or any other possibly shapes. FIG. 6 provides another embodiment of the calibration system. A saddle-shaped coil 70, which is constructed by two semicircle high conductive wire 71 connected with a rectangle conductive wire 72. The E field in this embodiment can also be evaluated by solving the integral equation system of Eq. (4). And the standard geosignals can be determined similarly.

Figure 7:
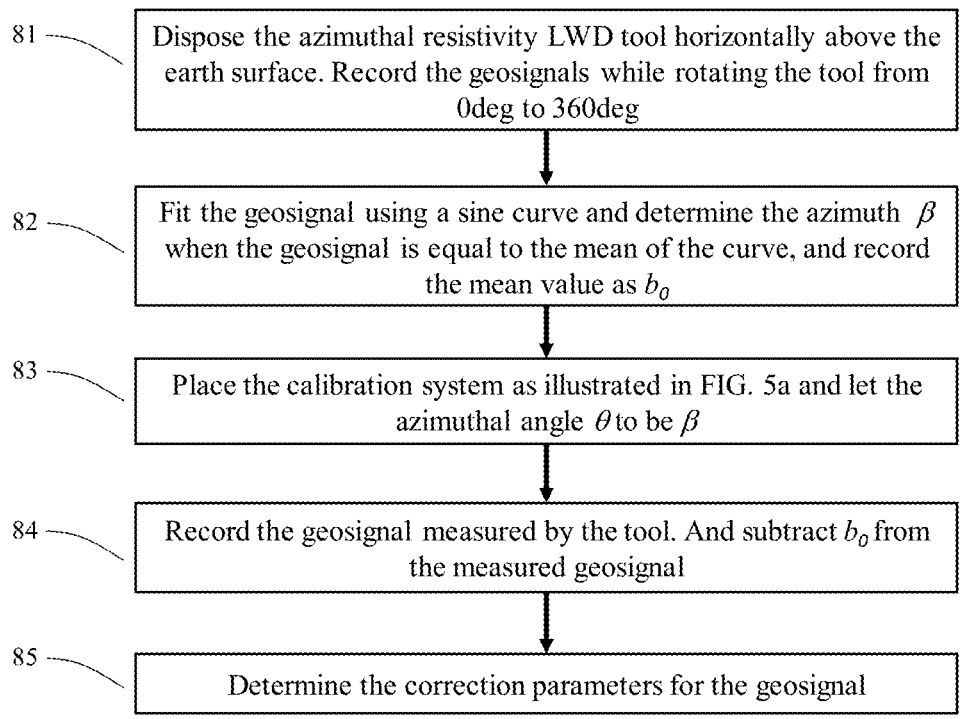
FIG. 7 shows an illustrative scheme of the calibration procedure.

What is explained in this disclosure is not only a system for calibrating Deep and Ultra-Deep azimuthal resistivity tools, but also a method and calibration procedures. FIG. 7 shows a functional block diagram of a representative calibration procedure. To make the calibration process as easy as possible, the calibration process should readily eliminate the effects of other environmental factors, such as the Earth's surface, conductive materials near the tool, etc. One relevant issue is the effects from the Earth's surface. Some other calibration methods, for example the method disclosed in U.S. Patent App. Pub. No. 2005/0143920 A1 and U.S. Pat. No. 8,305,082 require measurements to be made at two or more elevations above the Earth's surface to evaluate and remove surface effects. As illustrated in FIG. 7, the procedure disclosed herein provides an easier and more accurate way to eliminate the Earth's surface effects.

FIG. 7 also illustrates the operation processes of the method and system disclosed in this disclosure. The calibration can be implemented using the following steps:

a) Dispose the azimuthal resistivity LWD tool horizontally above the Earth's surface at a certain height as shown at H in FIG. 5a. This height can be arbitrary. Record the receiver measurements of various signal components, e.g., voltage, used to determine parameters defined in step (d) below while rotating the tool about its longitudinal axis from 0° to 360°, as shown at 81;

b) Fit the obtained measurements to a sinusoidal curve of the form:

$$f(\phi) = A_1 \sin(2q\phi - \beta) + A_2 \sin(\phi - \beta) + b_0 \quad (7)$$

and determine the mean value $b_0$ of the sinusoidal curve and the corresponding azimuth angle β at the mean value as shown at 82.

c) Place the calibration loop as illustrated at 61 in FIG. 5a on the tool and let the azimuthal angle θ of the normal to the plane of the calibration loop be β as shown at 83;

d) For a selected external resistor and inductor (62 and 63 in FIG. 5a) in the calibration loop (61 in FIG. 5a), measure the voltage induced in the receiver, which may be used to calculate geosignal components (real voltage component VR, imaginary voltage component VI, azimuthally sensitive attenuation GA, and/or azimuthally sensitive phase shift GP), and subtract the mean value of the sinusoidal curve, $b_0$, from the measurement as shown at 84. In some embodiments, determining the mean and a corresponding azimuth angle comprises disposing the tool vertically and at an oblique angle to eliminate formation effects.

e) select a different value of resistor and/or inductor in the calibration loop and repeat the geosignal component measurement and subtraction of $b_0$; and e) Determine the correction parameters for the geosignal as shown at 85 using both sets of geosignal measurements. The correction parameters may be used to match the measured response of the tool to correspond to expected tool response to specific, known conditions, e.g., resistivity above and below a boundary, distance to the boundary (DTB) and direction of the boundary with respect to the tool. The correction parameters may be determined by the following technique.

A linear relationship may be used to describe the actual geosignal component measurements obtained when systematic errors exist.

$$S_m = a * S_{cal} + b \quad (8)$$

The measured geosignal component(s) can be regarded as a transform of the standard (corrected) measurements of the geosignal components by a multiplication (scale) factor a and an addition (offset) factor b. Two or more measurements can be obtained using different system impedances (e.g., by changing the value of the resistor and/or inductor in the calibration loop). Then, the correction parameters a and b can be determined. In some embodiments, a plurality of measurements using a plurality of different system impedances may be used to determine correction parameters defined by a higher order relationship than linear, e.g., a higher order polynomial relationship.

Figure 8:
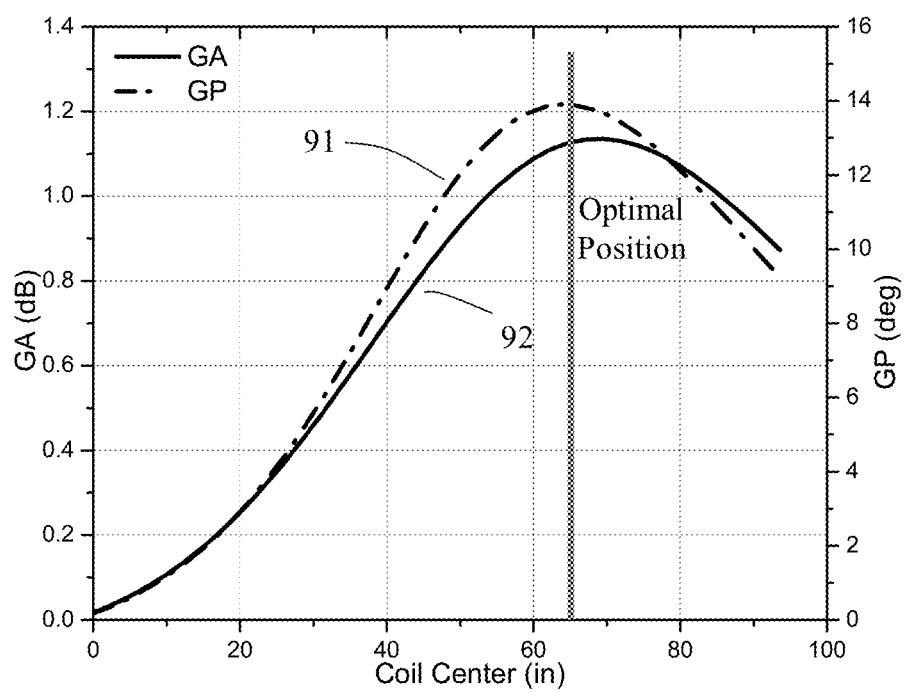
FIG. 8 shows the responses of a Deep azimuthal resistivity tool in one of the calibration embodiments.

Before the implementation of the calibration process, the optimal longitudinal position of the calibration loop (L1 in FIG. 5a) may be determined. This position can be determined by analyzing the tool's response, i.e., the component measurements defined above: real voltage component VR; imaginary voltage component VI; azimuthally sensitive attenuation GA; or azimuthally sensitive phase shift GP when the calibration loop center is at different longitudinal positions along the length of the tool. FIG. 8 shows graphs of the responses of a Deep Azimuthal Resistivity tool in one of the calibration apparatus of FIG. 5a with the calibration loop center at different longitudinal positions. In this case, the transmitter and receiver are at 0 in. and 96 in., respectively. A 1.5 m radius calibration loop (61 in FIG. 5a) is moved longitudinally from the transmitter position to the receiver position. It may be observed on the attenuation geosignal curve GA 92 and phase shift geosignal GP 91 that the location of 65 inches is an optimal position, where the geosignals are at or near their respective maximum values and are stable.

Figure 9A:
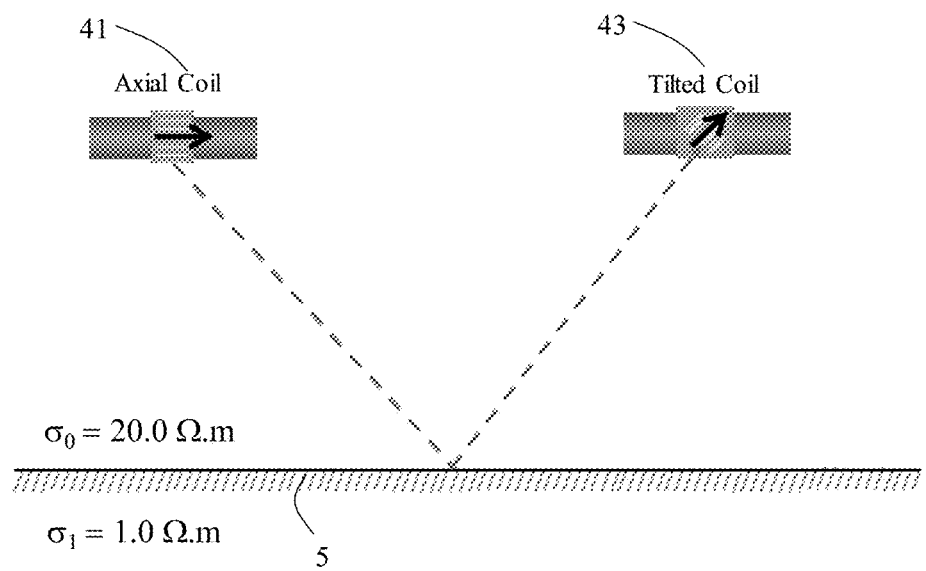
FIGS. 9a, 9b and 9c show the responses of a Deep azimuthal resistivity tool in one of the calibration embodiment vs the responses of the tool when a boundary is present.
Figure 9B:
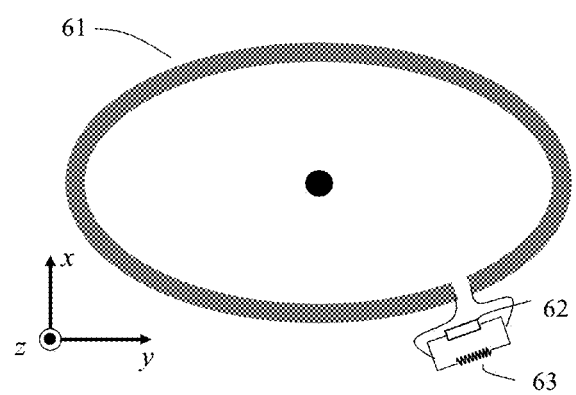
Figure 9C:
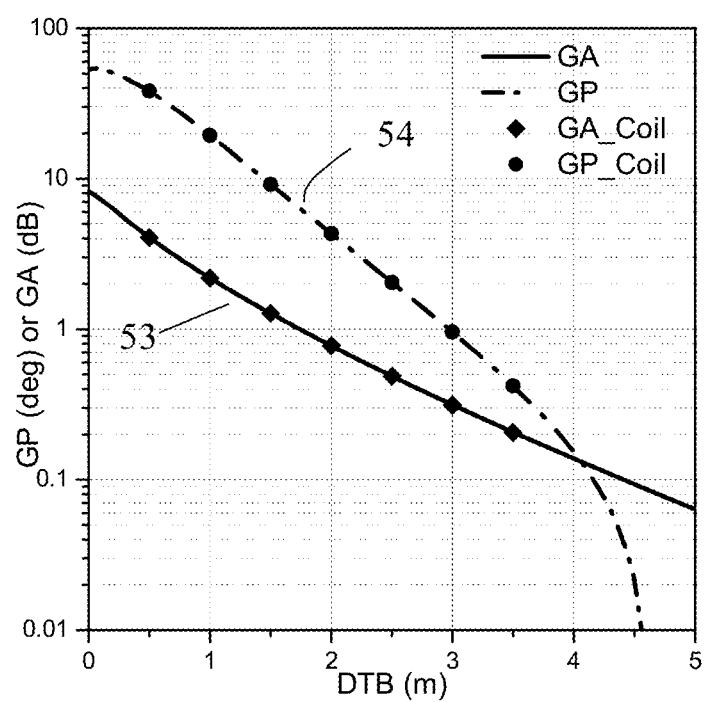

To further understand the method in this disclosure, FIG. 9c shows responses of an azimuthal resistivity tool in the calibration environment as contrasted with the tool's responses when it moves away from a boundary. For example, and referring briefly to FIG. 9a, a tool with an axial coil transmitter 41 and a tilted coil receiver 43 is moving away from a boundary 5 with a relative dip angle of 85 degrees. Referring back to FIG. 9c, the current layer and shoulder layer resistivity are 20 Ω·m and 1.0 Ω·m, respectively. When the tool moves away from the boundary, the geosignals (GA 53 for amplitude reduction and GP 54 for phase shift) will decrease. Using one embodiment of the calibration loop proposed in this disclosure and as illustrated in FIG. 9b, the GA 53 and GP 54 geosignals can be reconstructed by providing different calibration resistors 62 and inductors 63 in the calibration loop 61. Table I provides values for the corresponding resistors.

TABLE I

External resistors to simulate the tool's responses with different distance to boundary (DTB)

| DTB (m) | GA (dB) | GP (deg) | GA in Calibration system (dB) | GP in Calibration system (deg) | Resistor for GA (Ω · m) | Resistor for GP (Ω · m) |
| --- | --- | --- | --- | --- | --- | --- |
| 0.50 | 44.07 | 38.15 | 4.07 | 38.15 | 4.47 | 9.81 |
| 1.00 | 2.18 | 19.40 | 2.18 | 19.40 | 7.05 | 20.60 |
| 1.50 | 1.27 | 9.15 | 1.27 | 9.15 | 9.83 | 44.45 |
| 2.00 | 0.77 | 4.31 | 0.77 | 4.31 | 13.03 | 94.74 |
| 2.50 | 0.48 | 2.04 | 0.48 | 2.04 | 16.73 | 200.06 |
| 3.00 | 0.31 | 0.95 | 0.31 | 0.95 | 21.13 | 428.74 |
| 3.50 | 0.20 | 0.41 | 0.20 | 0.41 | 26.25 | 975.22 |

While the present disclosure has been described and disclosed in terms of a preferred embodiment, it will be understood that variation in the details thereof can be made without departing from the scope of the present disclosure, such scope being defined only by the appended claims.

What is claimed is:

1. A method for calibrating an azimuthally sensitive resistivity tool having at least one transmitter and at least one receiver, at least one of the transmitter and receiver comprising a dipole moment tilted or transverse to a longitudinal axis of the tool, the method comprising:

a) disposing the tool horizontally above the earth surface at a predetermined height, and recording measurements made by the at least one receiver while rotating the tool about the longitudinal axis from an angle of 0 degrees through 360 degrees;

b) fitting the recorded measurements with a sinusoidal curve, and determining a mean value of the measurements and an angle θ corresponding to a direction of the dipole moment when the recorded measurement is at the mean value;

c) placing a calibration loop having a first chosen impedance along the tool and setting an azimuthal angle of a normal to a plane of the calibration loop to the angle θ;

d) recording measurements of a component of voltage induced in the receiver related to a distance to a resistivity boundary, and subtracting the mean value from the recorded measurements;

e) changing the first chosen impedance to a second chosen impedance and repeating the recording measurements of the component of voltage induced; and f) determining correction parameters for the component of voltage induced using the recorded measurements made using the first chosen impedance and the second chosen impedance.

2. The method of claim 1, wherein the azimuthal resistivity LWD tool comprise at least one of a Deep azimuthal resistivity LWD tool and an Ultra-Deep azimuthal resistivity LWD tool.

3. The method of claim 1, wherein the calibration loop comprises at least one of a circle, an ellipse, and a saddle-shaped loop.

4. The method of claim 1, wherein the determining the mean value comprises fitting measurements made when the tool rotates from 0 to 360 degrees, and comprises using two or more measurements to determine the minimum value and corresponding azimuth angle.

5. The method of claim 1, wherein the determining the mean and the corresponding azimuth angle comprises disposing the tool vertically and at an oblique angle to eliminate formation effects.

6. The method of claim 1, wherein determining correction parameters is performed using a linear relationship between the measurements of the first component of voltage and expected response of the tool to specific, known conditions.

7. The method of claim 6 further comprising determining the correction parameters using a high order polynomial relationship.

8. The method of claim 1 further comprising optimizing a longitudinal position of the calibration loop along the tool.

9. The method of claim 8 wherein the optimizing comprises measuring a component of voltage induced in the receiver while moving the calibration loop along the tool, and choosing a longitudinal position along the tool wherein the component of voltage is related to a distance from an axis of the tool to a resistivity boundary.

10. The method of claim 9 wherein the component of voltage induced comprises at least one of phase shift and attenuation.

11. The method of claim 1 wherein the component of voltage induced comprises at least one of phase shift and attenuation.

12. The method of claim 1 wherein the first chosen impedance and the second chosen impedance correspond to known distances to a resistivity boundary from the tool.

13. The method of claim 1 wherein the first chosen impedance is changed to the second chosen impedance by changing a value of at least one of a resistor and an inductor in the calibration loop.

* * * * *